United States Patent
Jalilevand et al.

[11] Patent Number: 5,190,101
[45] Date of Patent: Mar. 2, 1993

[54] HEAT EXCHANGER MANIFOLD

[75] Inventors: Ali Jalilevand, Plymouth; Eugene E. Rhodes, Belleville, both of Mich.

[73] Assignee: Ford Motor Company, Dearborn, Mich.

[21] Appl. No.: 807,356

[22] Filed: Dec. 16, 1991

[51] Int. Cl.$^5$ .............................................. F28F 9/02
[52] U.S. Cl. .................... 165/176; 165/173; 29/890.052
[58] Field of Search .................. 165/176, 173; 29/890.052

[56] References Cited

U.S. PATENT DOCUMENTS

| | | |
|---|---|---|
| 3,668,757 | 6/1972 | Rieder . |
| 4,077,559 | 3/1978 | Watson, Jr. . |
| 4,130,232 | 12/1978 | Anderson . |
| 4,150,556 | 4/1979 | Melnyk . |
| 4,386,652 | 6/1983 | Dragojevic ............ 165/176 |
| 4,400,965 | 8/1983 | Schey . |
| 4,502,532 | 5/1985 | Tomozaki et al. . |
| 4,663,812 | 5/1987 | Clausen ................ 165/176 |
| 4,759,405 | 7/1988 | Metzger . |
| 4,770,240 | 9/1988 | Dawson et al. ........ 165/176 |
| 4,881,312 | 11/1989 | Dalo . |
| 5,090,477 | 2/1992 | Sprow ................. 165/176 |

FOREIGN PATENT DOCUMENTS

| | | |
|---|---|---|
| 533351 | 12/1954 | Belgium . |
| 572760 | 11/1958 | Belgium . |
| 3720483 | 1/1988 | Fed. Rep. of Germany . |
| 31946 | 10/1977 | Japan . |
| 807608 | 1/1959 | United Kingdom . |

OTHER PUBLICATIONS

Jens S. Sorensen and Merle M. Cleeton, "Unique Manufacturing Method-Automotive Air Conditioning Condenser Manifolds" SAE Technical Paper Series No. 890225.

Mikio Kajin and Michio Hiramats,"Introduction To Nippondenso Technology," Nippondenso Technical Center U.S.A., Inc. pp. 25-32.

Primary Examiner—Albert W. Davis, Jr.
Attorney, Agent, or Firm—Raymond L. Coppiellie; Clifford L. Sadler

[57] ABSTRACT

A manifold and a method of making a manifold for a tube and fin type heat exchanger are disclosed wherein the manifold is a one piece aluminum extrusion. The method includes the steps of extruding the material into a U-shaped channel having a base member and a pair of vertical walls, forming a plurality of fluid conducting passageways in the base member, and rolling the vertical walls toward the longitudinal center of the base member until the free ends of the walls contact the base member to form a pair of hollow longitudinal fluid conduits. The conduit are then crimped at predetermined locations to form fluid baffles and the manifold is then sealed.

13 Claims, 3 Drawing Sheets

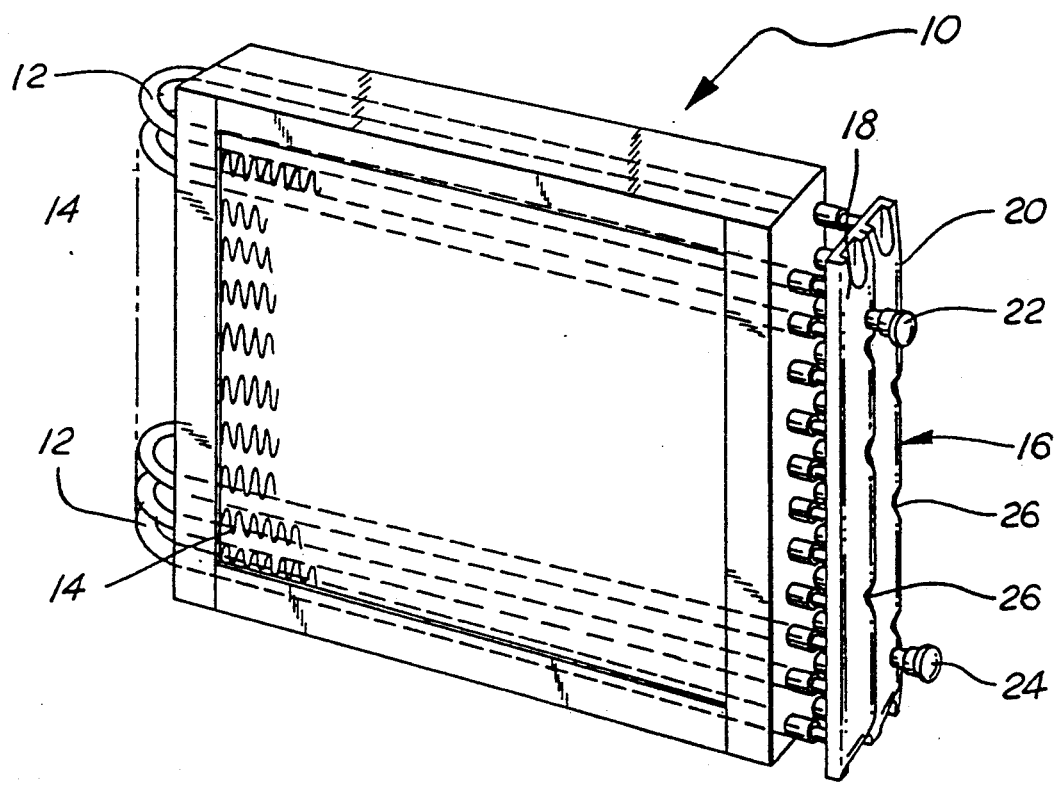
FIG.1
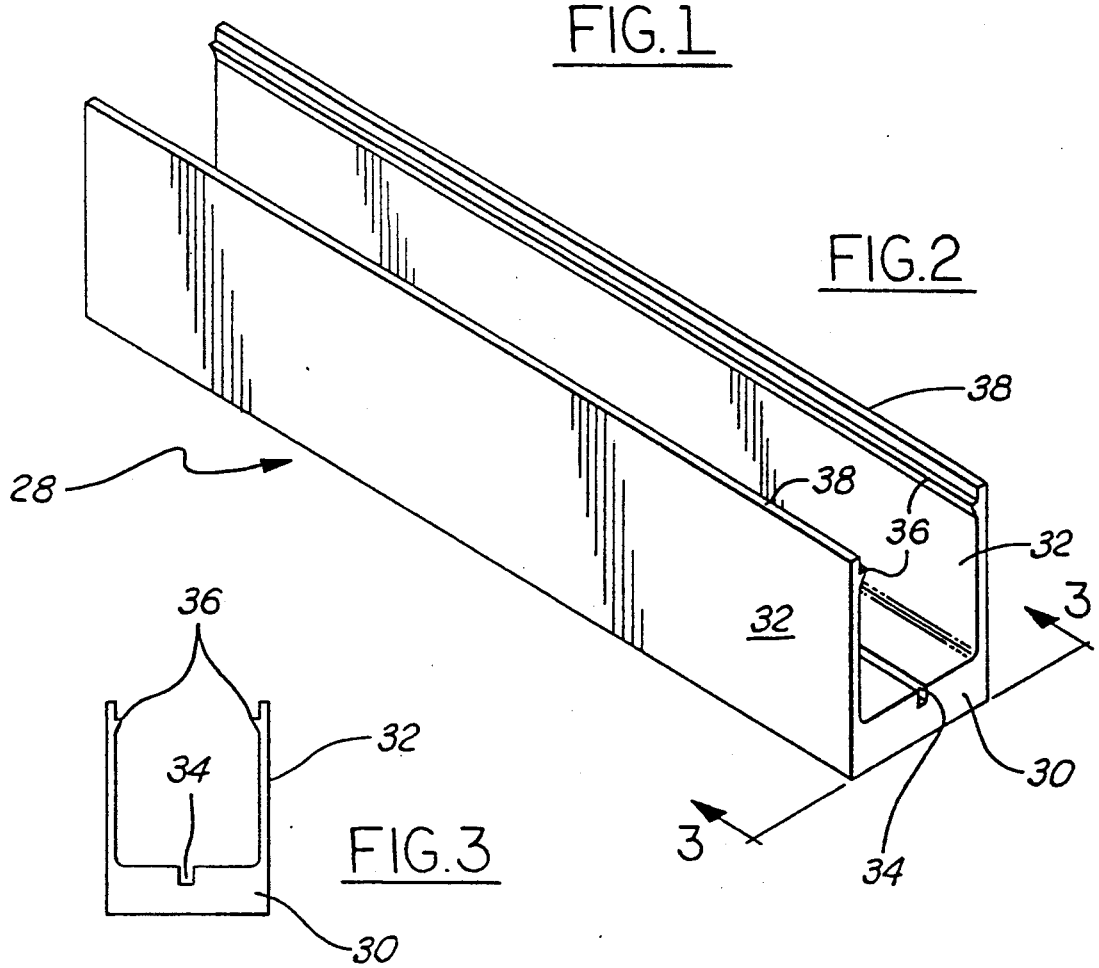
FIG.2
FIG.3

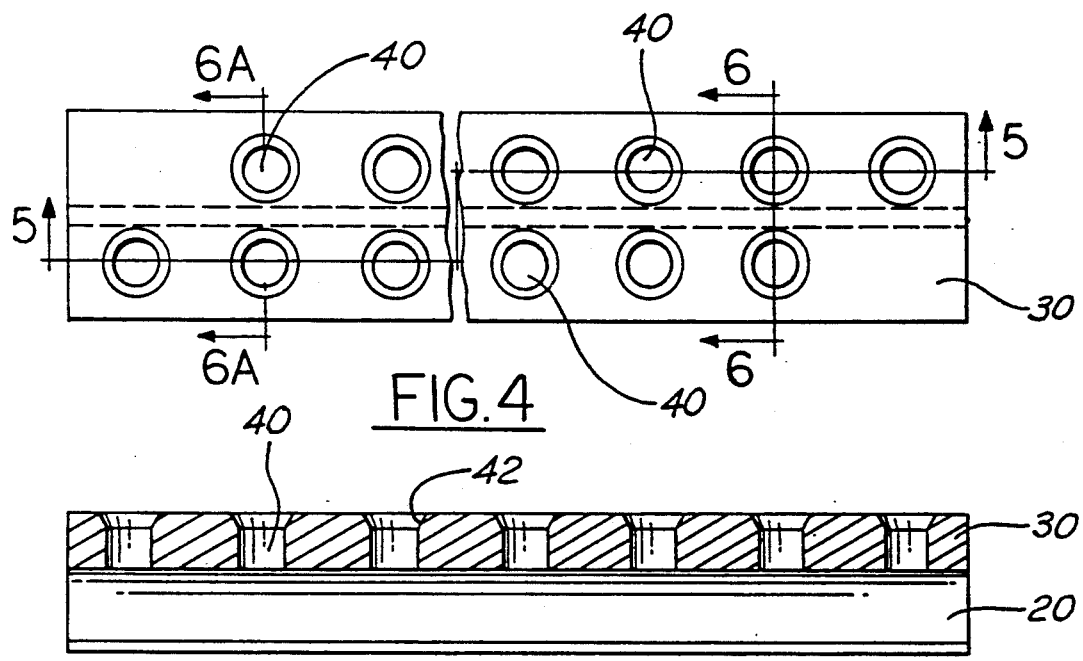
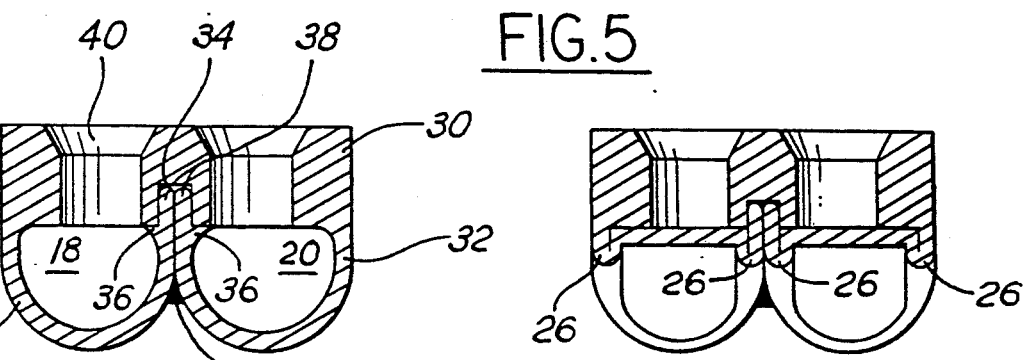
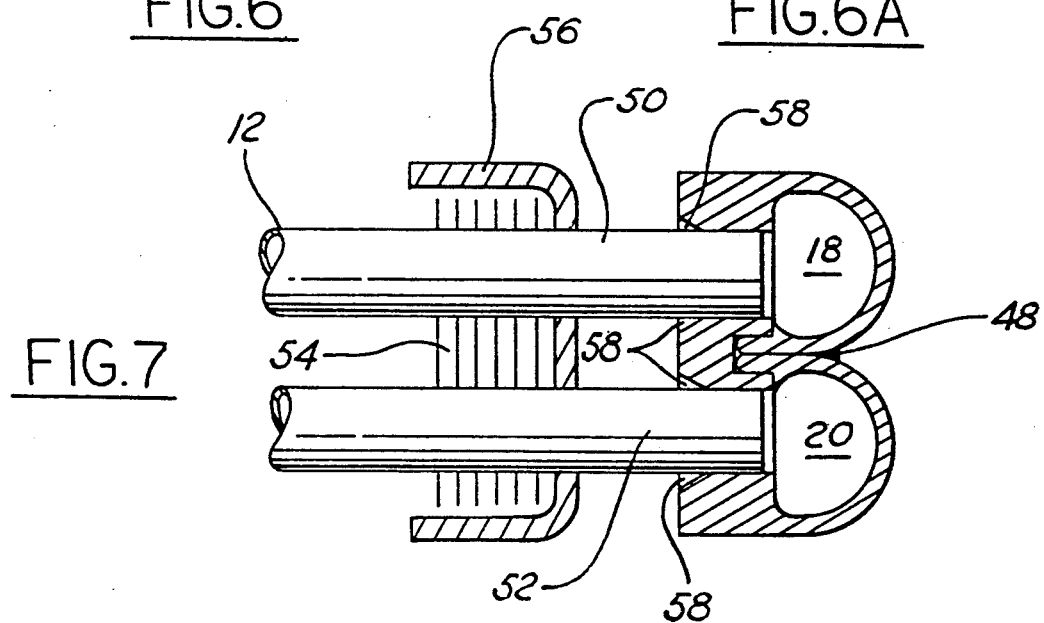

HEAT EXCHANGER MANIFOLD

BACKGROUND OF THE INVENTION

1. Field of the Invention

The present invention relates generally to manifolds for heat exchangers such as condensers, evaporators and oil coolers used in automotive vehicles. More particularly, the present invention relates to a manifold for use in a fin and tube type heat exchanger wherein the manifold is fabricated from an extruded metal member.

2. Disclosure Information

Fin and tube type heat exchangers are commonly used in vehicle, industrial and residential environments for heating and cooling purposes. Typically, these heat exchangers utilize a plurality of tubes to form a condenser or the like by having the fluid pass through a series of U-shaped tubes. The number of U-shaped tubes depends on the thermal capacity requirements of the fin and tube heat exchanger. In order to connect these tubes together so that the fluid can flow through the tubes, manifolds are used having a series of openings corresponding to and mating with the ends of the tubes. The manifolds have an inlet port and an outlet port which circulate the fluid through the heat exchanger and then returns the fluid to a remote location for subsequent recycling.

It is known in the art to fabricate manifolds having holes or flanges for receiving the tubes from a seamless tube in which the holes are punched and the flanges formed with a die. It is also known to manufacture manifolds having extensions for receiving the tubes using at least two pieces of material. The extensions are formed in a pressing operation from a piece of sheet metal, or by brazing or otherwise securing short, seamless, tubular extensions to holes in a larger tube, or from a bending operation in which half of each of the tubular extensions is formed from a piece of sheet metal which also forms half of the main body of the manifold. The two halves are then welded or otherwise secured together.

Other manufacturing processes are also known in the art to fabricate manifolds from a single piece of the formable material. For example, U.S. Pat. No. 4,770,240 discloses a manifold fabricated from a single sheet of metal, the manifold having a plurality of tubular portions formed in at least one row perpendicular to the plane of the metal sheet by drawing the metal sheet in a progressive die operation. A seam is formed at the opposite edge portion of the metal sheet to form a fluid conduit and then the end portions of the fluid conduit are sealed. The fabrication process involved in forming manifolds according to the '240 patent involves the use of a progressive die process which requires numerous stamping and forming operations. Furthermore, in forming the manifolds having a pair of fluid conduits, the process requires multiple welds to be formed at the interface of the conduit to the base portion of the members. Having a large number of weld seams increases the risk of leakage of the manifolds formed according to the '240 process. Also, manufacturing efficiency is substantially effected by the number of manufacturing operations which have to be performed in fabricating such manifold. Therefore, it would be advantageous to form the manifold with a fabrication process having fewer steps and fewer weld seams to result in increased manufacturing efficiency.

It is an object of the present invention to eliminate the manufacturing complexity of prior art manifold fabrication processes and to improve the functional performance of the manifolds.

It is a feature of the present invention that manifolds fabricated from the method of the present invention will be consistently manufactured to meet design requirements, resulting in increased manufacturing efficiency since the number of manufacturing operations needed to produce a manifold according to the present invention are reduced.

These and other objects, features and advantages of the present invention will become apparent from the following summary, brief description of the drawings, detailed description, and claims which follows:

SUMMARY OF THE INVENTION

The present invention overcomes the difficulties and deficiencies associated with prior art devices by providing a method of making a manifold for a heat exchanger comprising the steps of: extruding a Piece of plastically deformable material into a longitudinal U-shaped channel having a generally planar base member and a pair of vertically depending walls projecting generally perpendicularly to the plane of the base member; forming a plurality of fluid conducting passageways in said base member; and rolling said vertical walls towards the longitudinal center of said base member until the free ends of the walls contact said base member in sealing engagement therewith so as to form a pair of hollow longitudinal fluid conduits. The method further includes the step of crimping the hollow longitudinal fluid conduits at predetermined locations to direct the flow of fluid through the conduits according to a predefined fluid pathway.

There is also disclosed herein a manifold for a heat exchanger assembly, comprising a pair of hollow longitudinal fluid conduits disposed adjacent one another, each of the conduits defining a fluid conducting pathway therein. The pair of fluid conduits are formed from an extruded U-shaped channel member having a generally planar base member and a pair of vertically depending walls projecting generally perpendicularly to the plane of the base member where the pair of walls have been rolled into mating contact with the base member to form the fluid conduits. The manifold further includes a plurality of fluid conducting passageways defined in the base member, the passageways being in fluid communication with the pair of fluid conduits. The manifold also includes a plurality of crimped baffles formed in the Pair of fluid conduits at predetermined locations as well as an inlet port and an outlet port formed in the fluid conduit.

BRIEF DESCRIPTION OF THE DRAWINGS

FIG. 1 is a perspective view of a tube and fin heat exchanger including a manifold structured in accord with the principles of the present invention.

FIG. 2 is a perspective view of an extruded U-shaped channel member for use with the process of fabricating a manifold according to the method of the present invention.

FIG. 3 is a cross-sectional view of the U-shaped channel member of FIG. 2 taken along line 3—3.

FIG. 4 is an elevational view of one embodiment of a manifold structured in accord with the principles of the present invention.

FIG. 5 is a cross-sectional view of FIG. 4 taken along line 5—5.

FIG. 6 is a cross-sectional view of FIG. 4 taken along line 6—6.

FIG. 6A is a cross-sectional view of FIG. 1 taken along line 6A—6A.

FIG. 7 is a cross-sectional view of the manifold of FIG. 1 showing the mating engagement of the heat exchanger tubes with apertures formed in the manifold of the present invention.

DETAILED DESCRIPTION OF THE PREFERRED EMBODIMENT

Figure 8:
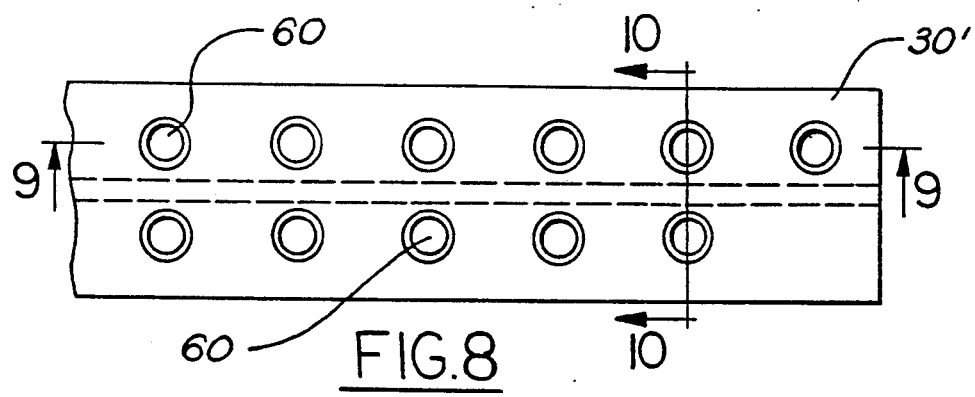
FIG. 8 is an elevational view of an alternative embodiment of a manifold of the present invention.
Figure 9:
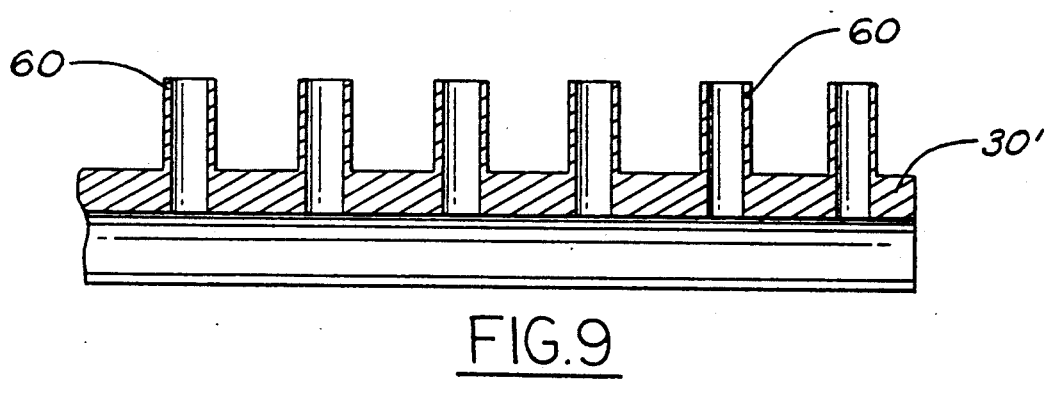
FIG. 9 is a cross-sectional view of an alternative embodiment manifold having extruded flanges.

Referring now to the drawings, FIG. 1 shows a tube and fin type heat exchanger 10 including a plurality of U-shaped tubes 12 with heat dissipative fins 14 interposed between each of the tubes 12. The free ends of the U-shaped tubes 12 matingly engage a manifold 16 disposed at one end of the heat exchanger 10. As shown in FIG. 1, manifold 16 is a double chambered manifold having a first fluid conduit 18 and a second fluid conduit 20. First fluid conduit 18 includes an inlet Port 22 for receiving fluid therein and fluid conduit 20 includes an outlet port 24 for discharge of fluid therefrom. As will be explained more fully below, manifold 16 further includes a plurality of crimped baffles 26 for directing fluid through the heat exchanger according to a predefined pathway. In accordance with principles well known in the heat exchanger art, fluid to be cooled (or heated) enters manifolds 16 through inlet port 22 and is directed through the plurality of U-shaped tubes 12 wherein the fluid is cooled by a secondary fluid, such as air, passing over the fins 14. The baffles 26 and the manifold 16 direct the fluid through the U-shaped tubes wherein the fluid eventually discharges from outlet port 24. It should be apparent to those skilled in the art that the heat exchanger of FIG. 1 utilizes a manifold having a pair of longitudinal fluid conduits although the present invention may be utilized in conjunction with a manifold having a single fluid conduit.

The manifold 16 is fabricated from an extruded aluminum alloy such as SAE 3003, 3102, or 6062 or any of another of known types of deformable materials. Manifold 16 is formed according to the method of the present invention by extruding an aluminum blank into a U-shaped channel member such as is shown in FIGS. 2 and 3. The U-shaped channel member 28 is an elongated member having a generally planar base 30 with a pair of vertical walls 32 depending generally perpendicularly to the plane of the base. The base 30 includes a U-shaped slot 34 running the longitudinal length of the channel member 28 approximate medially to the longitudinal axis of the channel member 28. Each of the vertical walls 32 includes an inwardly extending flange 36 disposed near the free ends 38 of the walls. As can be seen in FIG. 3, the inwardly extending flanges 36 are angled away from the plane of the base member 30 of channel 28 for reasons which will become apparent below.

After the U-shaped channel member 28 has been extruded, the next step in the method of the present invention in fabricating manifold 16 is to form a plurality of fluid conducting passages in the base member 30 of channel member 28. FIGS. 4–6 show one type of fluid-conducting passageway formed in base member 30. Apertures 40 are formed by a piercing operation in base member 30. The apertures 30 have a predetermined configuration as can be seen in FIG. 5 wherein one end of apertures 40 are flared 42. The apertures 40 communicate with the fluid conduits 18, 20 of the manifold 16. The flared ends 42 of apertures 40 are configured to receive the free ends of the U-shaped tubes 12 of the heat exchanger therein.

After the apertures 40 have been pierced into base member 30, the next step of the method of the present invention is to roll the vertical walls 32 toward the longitudinal center of the base member 30 until the free ends 38 of the walls 32 engage the U-shaped slot 34 of the base member 30 as shown in FIG. 6. The walls 32 are rolled until the inwardly extending flanges 36 contact the base member 30. The angle of the inwardly extending flanges provide a positive seal when they have engaged the slot 34.

After the vertical walls have been rolled, the baffles 26 are then mechanically crimped into each of the fluid conduits 18, 20 according to a predefined location to achieve the desired circulation of fluid as in FIG. 6A The crimping operation may be achieved in any of a number of known mechanical processes. After the manifold has been crimped, the inlet port 22 and outlet port 24 are formed according to known manufacturing processes. A weld seam or brazed joint is then formed along the longitudinal length of the manifold as shown at 48 in FIG. 6 between each of the fluid conduits 18 and 20. The transverse ends of the fluid conduits are then sealed also through a brazing or welding operation.

After the manifold has been manufactured according to the above process, the U-shaped tubes are connected to the manifold 16. FIG. 7 shows a cross-sectional view of the heat exchanger of FIG. 1 showing one U-shaped tube having both ends 50, 52 joined to the manifold 16 of the present invention. As shown in FIG. 7, the free ends 50, 52 of the U-shaped tube of the heat exchanger matingly engage apertures 40 of the manifold. A fin 54 and end plate 56 complete the assembly. Solder joints 58 are formed at the flared end 42 of each aperture to ensure a leak-free, secure joining of the manifold to the U-shaped tube ends 50, 52. The manifold may be joined to the heat exchanger in any of a number of known processes such as by vacuum, brazing or welding the manifold thereto.

Figure 10:
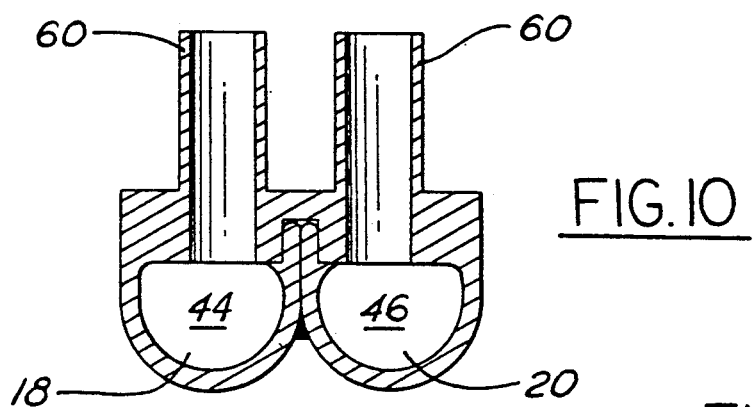
FIG. 10 is a cross-sectional view of FIG. 8 taken along line 10—10.
Figure 11:
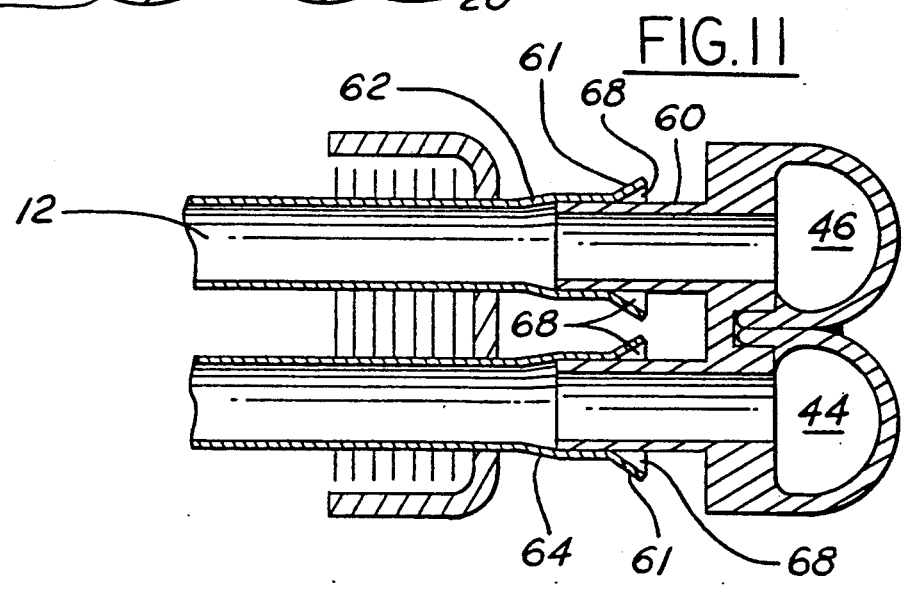
FIG. 11 is a cross-sectional view of the manifold of FIGS. 8, 9 showing engagement of the free ends of the tubes of a heat exchanger with the manifold structured in accord with the principles of the present invention.

FIGS. 8–11 show a second embodiment of the present invention wherein the plurality of fluid conducting passageways in the base member 30' are formed during the extrusion of the U-shaped channel member. The fluid conducting passageways are extruded as tubular members 60 projecting perpendicularly to the plane of the base member 30'. The diameter of the tubular member 60 must be less than the diameter of the free ends of the U-shaped tubes of the heat exchanger so that a non-leaking seal can be formed between the manifold 16 and the U-shaped tubes 12. As shown in FIG. 10, each of the tubular members 60 communicates with an interior volume 44 or 46 of the fluid conducting members 18, 20. This allows fluid to pass from the fluid conduits 18, 20 through the fluid conducting passageway 60 and into the U-shaped tubes 12. As can be seen in FIG. 11, a plurality of solder joints 68 are formed between the interface of the flared ends 61 of the free ends 62, 64 of tube 12 to provide a nonleaking seal therebetween. Extruding the tubular members 60 from the U-shaped channel member represents an improvement over prior art designs wherein the tubular projections were often brazed or welded to a base member of the manifold or wherein the tubular members are progressively stamped. Stamping operations require that the tubular members be made of a thicker material to avoid cracking of the tubular members during the stamping operations. All of these problems are overcome by the present invention which provides a manifold for a heat exchanger formed in accordance with the above steps.

In view of the above, variations and modifications to the present invention will no doubt occur to those skilled in the art. For example, the method of manufacturing the manifold from a single extruded piece of aluminum can also be performed for a single manifold as well as a double manifold. Various other materials may also be chosen to fabricate the manifolds and the present invention is not meant to be limited solely to those specified above. It is the following claims, including all equivalents which define the scope of our invention.

What is claimed is:

1. A method of making a manifold for a heat exchanger, comprising the steps of:
   extruding a piece of plastically deformable material into a longitudinal U-shaped channel having a generally planar base member and a pair of vertically depending walls projecting generally perpendicularly to the plane of said base member;
   forming a plurality of fluid conducting passageways in said base member;
   rolling said vertical walls toward the longitudinal center of said base member until the free ends of said walls contact said base member so as to form a pair of hollow longitudinal fluid conduits; and
   crimping said hollow longitudinal fluid conduits at predetermined locations so as to direct the flow of fluid through said hollow conduits according to a predefined fluid pathway.

2. A method according to claim 1, wherein the step of extruding a longitudinal U-shaped channel further includes the step of forming a U-shaped slot in said base member of said channel and forming an inwardly extending flange disposed on each of said vertical walls a predetermined distance from said base member.

3. A method according to claim 2, wherein the step of rolling said vertical walls until the free ends thereof contact said base member further includes the step of rolling said walls so that said free ends matingly engage said U-shaped slot formed in said base member and until said inwardly extending flanges contact said base member.

4. A method according to claim 1, wherein the step of forming a plurality of fluid conducting passageways includes the step of punching a plurality of apertures of predefined shaped in a predefined configuration in said base member.

5. A method according to claim 1, wherein the step of forming a plurality of fluid conducting passageways includes the step of extruding a plurality of tubular members from said base member.

6. A method according to claim 1, further including the step of sealing each of said fluid conduits along both a longitudinal axis between said fluid conduits and along both transverse ends of said conduits.

7. A method according to claim 1, further including the step of forming a plurality of inlet and outlet ports on said pair of fluid conduits.

8. A method of making a header for a heat exchanger, comprising the steps of:
   extruding a piece of plastically deformable material into a longitudinal U-shaped channel having a generally planar base member and a pair of vertically depending walls projecting generally perpendicularly to the plane of said base member;
   forming a longitudinal U-shaped slot in said base member of said channel generally parallel to the longitudinal axis of said base and forming an inwardly extending flange disposed on each of said vertical walls a predetermined distance from said base member;
   punching a plurality of apertures of predefined shape in a predefined configuration in said base member to form a plurality of fluid conducting passageways in said base member;
   rolling said vertical walls toward the longitudinal center of said base member so that the free ends of said vertical walls matingly engage said U-shaped slot formed in said base member and until said inwardly extending flanges contact said base member to form a pair of hollow longitudinal fluid conduits;
   crimping said hollow longitudinal fluid conduits at predetermined locations so as to direct the flow of fluid through said hollow conduits according to a predefined fluid pathway; and
   sealing each of said fluid conduits along both a longitudinal axis between said fluid conduits and along both transverse ends of said conduits.

9. A manifold for a heat exchanger assembly, comprising:
   a pair of hollow longitudinal fluid conduits disposed adjacent one another, each of said conduits defining a fluid conducting pathway therein, said pair of fluid conduits being formed from an extruded U-shaped channel member having a generally planar base member and a pair of vertically depending walls projecting generally perpendicularly to the plane of said base member and wherein said pair of walls have been rolled into mating contact with said base member to form said pair of fluid conduits;
   a plurality of fluid conducting passageways defined in said base member, said passageways being in fluid communication with said pair of fluid conduits;
   a plurality of crimped baffles formed in said pair of fluid conduits at predetermined locations; and
   at least one inlet port and at least one outlet port formed in each of said fluid conduits.

10. A manifold according to claim 9, wherein said U-shaped channel member further includes a U-shaped slot formed in said base member as well as an inwardly extending flange disposed on each of said vertical walls a predetermined distance from said base member.

11. A manifold according to claim 9, wherein said plurality of fluid conducting passageways comprises a plurality of apertures having a predefined shape and staggered on said base member according to a predetermined configuration.

12. A manifold according to claim 9, wherein said plurality of fluid conducting passageways comprises a plurality of extruded tubulars members disposed in a predetermined configuration on said base member.

13. A manifold according to claim 9, wherein said manifold is fabricated from a material selected from the group consisting essentially of SAE 3003 Al, SAE 3102 Al, and SAE 6062 Al.

* * * * *